(12) United States Patent
Schmerling et al.

(10) Patent No.: US 10,859,239 B2
(45) Date of Patent: Dec. 8, 2020

(54) LIGHT WEIGHT APPLIANCE TO BE USED WITH SMART DEVICES TO PRODUCE SHORTWAVE INFRARED EMISSION

(71) Applicant: Cyalume Technologies, Inc., West Springfield, MA (US)

(72) Inventors: Reuven Schmerling, Amherst, MA (US); William R. Palmer, Rescue, CA (US); Stephen L. Palmer, Cameron Park, CA (US)

(73) Assignee: Cyalume Technologies, Inc., West Springfield, MA (US)

( * ) Notice: Subject to any disclaimer, the term of this patent is extended or adjusted under 35 U.S.C. 154(b) by 0 days.

(21) Appl. No.: 16/044,302

(22) Filed: Jul. 24, 2018

(65) Prior Publication Data

US 2019/0128506 A1 May 2, 2019

Related U.S. Application Data

(60) Provisional application No. 62/536,258, filed on Jul. 24, 2017, provisional application No. 62/536,253, filed on Jul. 24, 2017.

(51) Int. Cl.

| *F21V 9/30* | (2018.01) |
| *F21V 17/04* | (2006.01) |
| *G02B 5/28* | (2006.01) |
| *G02B 1/04* | (2006.01) |
| *G02B 5/22* | (2006.01) |
| *G02B 5/20* | (2006.01) |
| *F21V 9/04* | (2018.01) |
| *C09K 11/77* | (2006.01) |

(52) U.S. Cl.
CPC .............. *F21V 9/30* (2018.02); *F21V 9/04* (2013.01); *F21V 17/04* (2013.01); *G02B 1/04* (2013.01); *G02B 5/208* (2013.01); *G02B 5/223* (2013.01); *G02B 5/285* (2013.01); *C09K 11/77* (2013.01)

(58) Field of Classification Search
CPC .................................. F21V 9/30; F21V 17/04
See application file for complete search history.

(56) References Cited

U.S. PATENT DOCUMENTS

| 7,777,208 B2 | 8/2010 | Cranor |
| 2005/0200946 A1* | 9/2005 | Bryant ................. G02B 13/146 359/357 |

(Continued)

FOREIGN PATENT DOCUMENTS

| WO | WO2008112886 | 9/2008 |
| WO | WO2009036307 | 3/2009 |

OTHER PUBLICATIONS

Liang, Y. et al, "Extending the applications for lanthanide ions: efficient emitters in short-wave infrared persistent luminescence", J. Mater. Chem. C., vol. 5, pp. 6488-6492, (2017).

*Primary Examiner* — Eliza W Osenbaugh-Stewart
(74) *Attorney, Agent, or Firm* — McHale & Slavin, P.A.

(57) ABSTRACT

A short wavelength infrared (SWIR) energy emitting unit, and device having a SWIR emitting unit, for producing SWIR energy from an emission source emitting electromagnetic energy. The SWIR energy unit comprises a phosphor material, an electromagnetic energy blocking member, a substrate for delivering the system or material to an electromagnetic energy emission source, and optionally, an attachment member.

8 Claims, 13 Drawing Sheets

(56) References Cited

U.S. PATENT DOCUMENTS

| | | | |
|---|---|---|---|
| 2008/0246388 A1* | 10/2008 | Cheon | G02F 2/02 |
| | | | 313/501 |
| 2009/0072166 A1* | 3/2009 | Cranor | F21K 2/06 |
| | | | 250/504 R |
| 2011/0294543 A1* | 12/2011 | Lapstun | H04N 1/00129 |
| | | | 455/556.1 |
| 2012/0113672 A1* | 5/2012 | Dubrow | B82Y 20/00 |
| | | | 362/602 |
| 2015/0288892 A1 | 10/2015 | Frank et al. | |
| 2016/0313549 A1* | 10/2016 | Agrawal | F21V 9/32 |

\* cited by examiner

LIGHT WEIGHT APPLIANCE TO BE USED WITH SMART DEVICES TO PRODUCE SHORTWAVE INFRARED EMISSION

CROSS REFERENCE TO RELATED APPLICATIONS

In accordance with 37 C.F.R. 1.76, a claim of priority is included in an Application Data Sheet filed concurrently herewith. Accordingly, the present invention claims priority to U.S. Provisional Patent Application No. 62/536,258, entitled "LIGHT WEIGHT APPLIANCE TO BE USED WITH SMART DEVICES TO PRODUCE SHORTWAVE INFRARED EMISSION" filed Jul. 24, 2017, and U.S. Provisional Patent Application No. 62/536,253 entitled "THIN LAMINAR MATERIAL FOR PRODUCING SHORT WAVE INFRARED EMISSION" filed Jul. 24, 2017. The contents of the above referenced applications are incorporated herein by reference in its entirety.

FIELD OF THE INVENTION

The present invention relates to a short-wavelength infrared energy emitting system that can be adapted to produce SWIR energy from existing electromagnetic energy producing items; and more particularly, to a device that functions with a smart phone, smart tablet or similar device to produce shortwave infrared radiation.

BACKGROUND OF THE INVENTION

Near-infrared radiation has been used for some time to make observations in the dark. For example, the study of nocturnal animals has been significantly enhanced through the use of night vision equipment and near-infrared illuminators. Night Vision equipment and near-infrared illuminators have also been used for law-enforcement and military purposes. The ability of one to "see in the dark" can provide a significant advantage over those who cannot. This advantage is, of course, diminished as adversaries also gain access to this technology. A solution may be realized through the application of infrared energy sources that are not visible to standard night vision equipment.

The use of Shortwave Infrared (SWIR) energy provides one such solution. The SWIR band is generally considered to be those wavelengths between approximately 1000 nanometers and approximately 3000 nanometers. The Near-Infrared (NIR) band is generally considered to be those wavelengths between approximately 700 nanometers and 1000 nanometers. SWIR energy wavelengths are longer than those of Near-Infrared (NIR) and, as such, are invisible to standard night vision equipment. Additionally, energy in the SWIR band is not visible to "day/night" cameras, which are capable of imaging in the NIR bands, as well as the visible (VIS). SWIR imagers typically employ InGaAs (indium gallium arsenide) chemistry in their imaging sensors. Since these imagers are difficult to manufacture and are relatively expensive, they have not proliferated to the extent that night vision equipment has and, therefore, the use of SWIR imagers and SWIR illuminators still offers a tactical advantage in many environments. The SWIR illuminators may, of course, also be used for signaling and identification purposes, in addition to being sources of illumination for imagers. SWIR energy may be generated by special LEDs, lasers, filtered incandescent sources, and other known means. All of these SWIR energy systems require the use of electric power supplies.

While all the above sources of SWIR energy are functional, they must rely on bulky batteries or other sources of electricity for portable operation. A typical United States Marine carries about 100 pounds of gear. This weight not only hinders movement of the soldier, but also promotes injuries. Each pound, whether it be water, food, equipment or batteries, adds to this burden. If the function of an existing item already being carried could be adapted at will to produce SWIR energy, it would be of significant value. In addition to lessening the weight load, such a system could be less bulky than traditional SWIR generating equipment and would further provide one less item the soldier would need to keep track of. Since such a system could utilize the batteries already being carried to power another device, the additional weight of the system would be minimal. It would of course be desirable that any system not irreversibly hinder the normal operation of the existing item to which it is applied.

SUMMARY OF THE INVENTION

The present invention is directed towards a short-wavelength infrared energy emitting system, and device with the SWIR emitting system, that can be adapted to produce SWIR energy from existing electromagnetic emitting items, such as a smart phone, a smart tablet or flashlight. The phosphor allows the SWIR energy system or material to emit SWIR, preferably when excited at its absorption wavelengths associated with visible or ultraviolet light.

Generally, the present invention provides a device that may be attached to or otherwise incorporated with a visible light producing device, such as an electronic device including a smart phone, smart tablet, flashlight or the like. The device produces SWIR energy emission when coupled to the visible light producing device and the source of visible light is switched on. The device could also serve to at least partly block visible and NIR emissions from the light-producing device to which it is applied. Such a device would be highly desirable for situations where the user needs to produce SWIR energy but must be careful not to emit visible or NIR energy. It would also be highly beneficial if the device was compact, lightweight, capable of surviving exposure to rain, sunlight, temperature extremes, and was mechanically robust. The device would find even greater utility if the visible light emitting device could be switched on and off as may be desired, for example, in a pre-determined pattern, thereby permitting coded signals to be produced.

It has been discovered that an efficient, compact, lightweight energy conversion device, suitable for the intended application, can be created using certain rare-earth phosphors in combination with various selective wavelength-blocking, optical filters. The filters at least partially block emissions of NIR and visible light. Other aspects of the disclosure comprise various rigid, flexible or semi-flexible devices that are configured to be readily applied to visible light emitting devices.

In an illustrative example, the invention may include a short-wavelength infrared energy producing unit configured to affix to a device capable of emitting at least one source of electromagnetic energy comprising a substrate material securable to said device capable of emitting at least one source of electromagnetic energy; a phosphor layer; and an electromagnetic energy blocking member. The unit may further include an attachment member, which may be an adhesive substance or a structure such as a boot or cap, or elastic/stretchable band.

In another embodiment, the invention may include a device configured for producing short-wavelength infrared emissions comprising at least one source for emitting electromagnetic energy; a short-wavelength infrared energy producing unit configured for converting said electromagnetic energy emitted from said device to short-wavelength infrared energy, said short-wavelength infrared energy producing unit comprising a substrate material sized and shaped to cover said at least one source for emitting an electromagnetic energy; a phosphor material; and an electromagnetic energy blocking member. The unit may further include an attachment member for attaching said short-wavelength infrared energy producing unit to said at least one source for emitting electromagnetic energy.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1A:
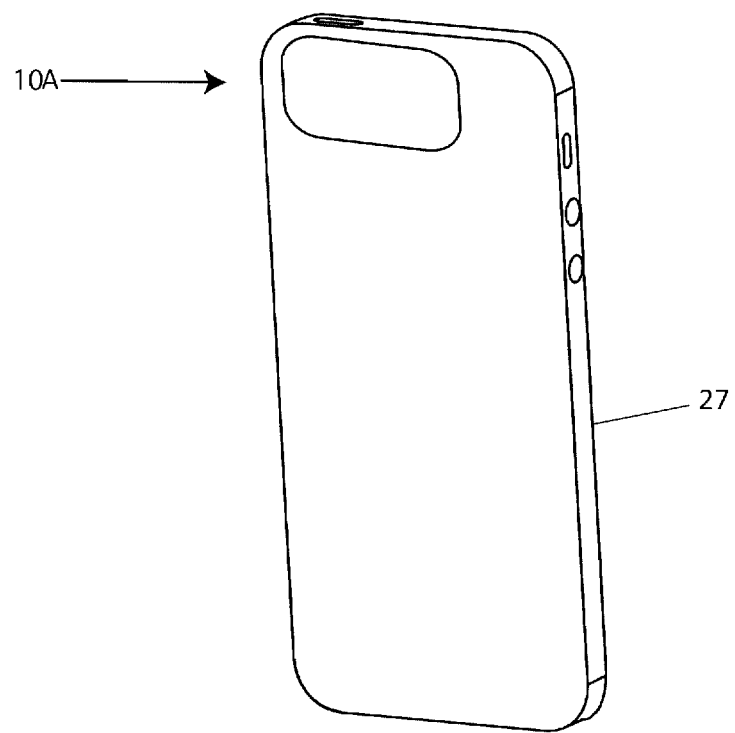
FIG. 1A is a perspective view illustrating an embodiment of a short-wavelength infrared energy producing unit configured to affix to a device capable of emitting at least one source of electromagnetic energy, shown incorporating an adhesive to permit attachment to a device having at least one source for emitting electromagnetic energy, such as the light.

While the present invention is susceptible of embodiment in various forms, there is shown in the drawings and will hereinafter be described, a presently preferred, albeit not limiting, embodiment with the understanding that the present disclosure is to be considered an exemplification of the present invention and is not intended to limit the invention to the specific embodiments illustrated.

The present invention is directed towards a short-wavelength infrared energy producing unit configured to affix to a device capable of emitting at least one source of electromagnetic energy, preferably visible or ultraviolet light, and a device having at least one source for emitting electromagnetic energy having or utilizing the short-wavelength infrared energy producing unit, both referred to generally as SWIR energy producing unit 10. The SWIR energy producing unit 10 comprises a phosphor material layer; an electromagnetic energy blocking member layer; a substrate layer for delivering the unit to an emission source, and optionally, an attachment member. The phosphor allows the SWIR energy producing unit 10 to emit SWIR, preferably when excited at its absorption wavelengths associated with visible or ultraviolet light.

Phosphors that are capable of producing SWIR energy when exposed to visible light are known. For example, the SWIR energy producing unit 10 may use one or more rare-earth phosphors, i.e. lanthanides (those chemicals listed on the chemical table having atomic numbers from 57-71, including Lanthanum, (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu)), as well as Scandium and Yttrium. The term "phosphors", as used herein, also includes engineered fluorescers, such as "quantum dots." Illustrative examples of the desired phosphor preferably emit energy at various wavelengths of between about 1000 nm and about 3000 nm. One illustrate example may be the phosphor which produces a Nd:YAG laser. As used herein, the term "about" or "approximately" means plus or minus 10% of the stated value.

Figure 8:
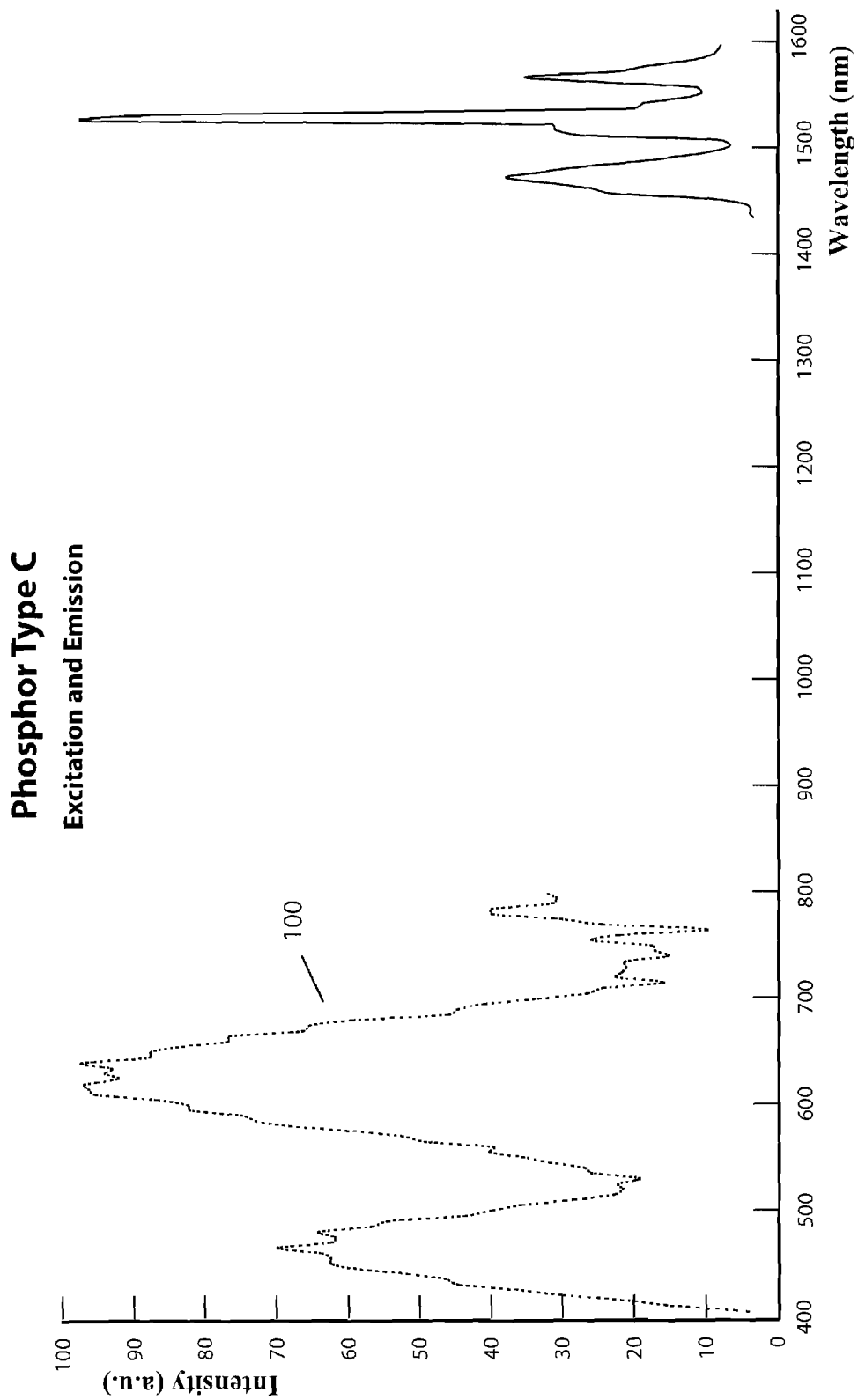
FIG. 8 illustrates an absorption and emission spectra of a phosphor which exhibits strong absorption between about 540 nm and 700 nm.

One particular phosphor is capable of emitting energy at various wavelengths between about 1400 nm and 1600 nm, when properly excited at its absorption wavelengths of between about 400 nm and about 800 nm. Referring to FIG. 8, it can be seen that the phosphor exhibits strong absorption 100 between about 540 nm and 700 nm. The data display screens of smart devices typically produce full-color images by combining various levels of red, blue and green light. Red light, as seen by the human eye, has a wavelength of between approximately 620 nm and approximately 750 nm, so a light emitting smart device, such as a smart phone with a data display screen comprising red emitters, typically LEDs, would be suitable for excitation of this phosphor. Blue light (approximately 450 nm-495 nm) and green light (approximately 495 nm-570 nm) could also be functional in this system. Although, depending on the spectral distribution of the excitation light and the excitation spectra of the phosphor chosen, it may not function as efficiently as excitation of the phosphor using red light. Ultraviolet light may also be used to excite the phosphor for this application.

Many smart devices now have built-in cameras. In addition to the relatively low power LEDs in the data display screen, these devices also have built-in "white light" illuminators to provide light to the scene to be photographed. These light sources are most commonly very bright "white" LEDs. This light is rich in visible red light, as well as light of other wavelengths that can effectively excite a SWIR emitting phosphor. The spectra of the white light illuminator in an Apple iPhone 5S camera flash is shown in FIG. 9.

Figure 9:
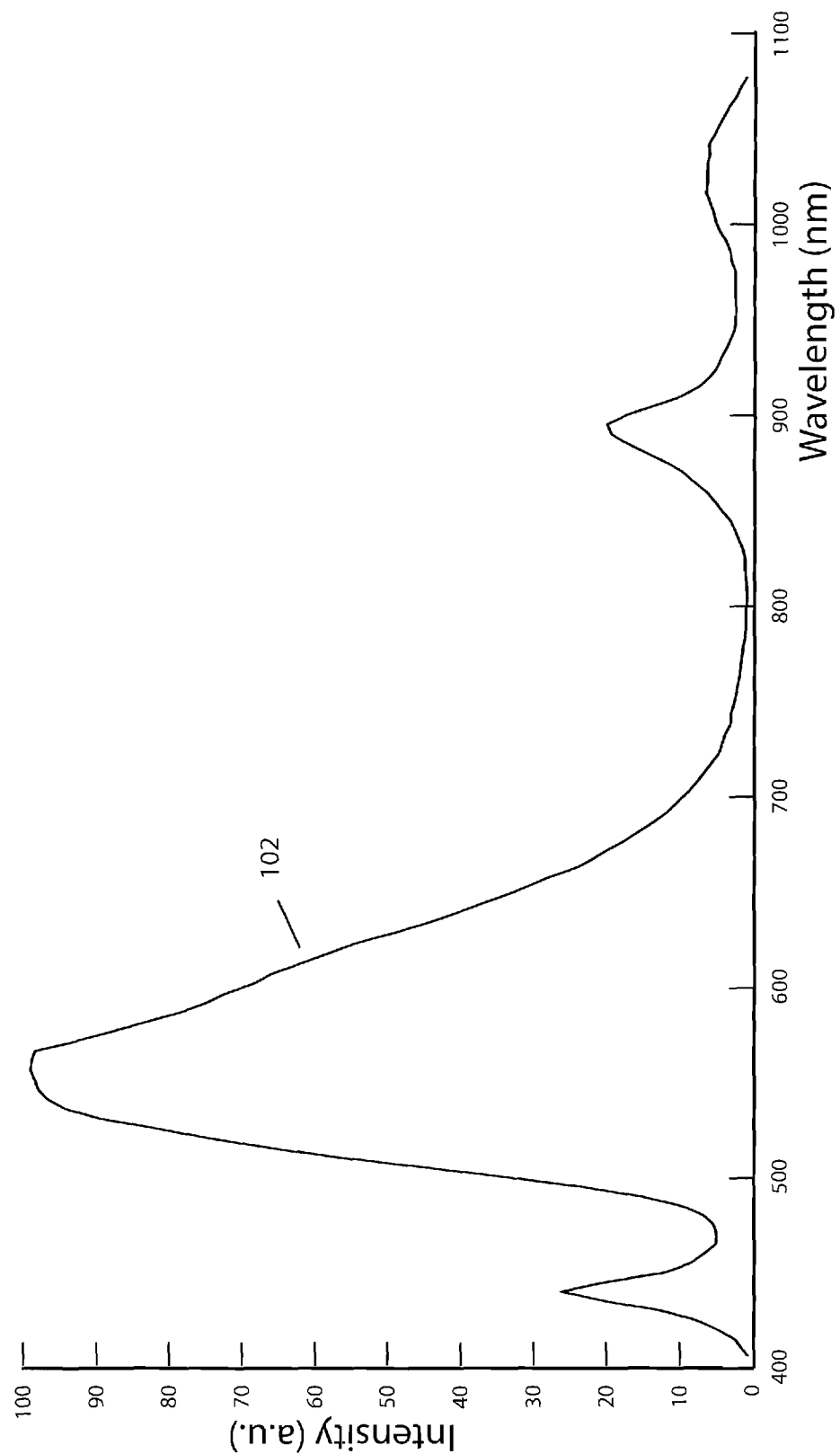
FIG. 9 is a spectra of a white light illuminator from an Apple iPhone 5S camera flash.

As can be seen from FIG. 9, the white light emission 102 of the camera illuminator comprises several wavelengths of light suitable for excitation of the SWIR phosphor described above. Since these white light emitters are exceptionally bright, they can be effectively used to excite a SWIR emitting phosphor, thereby producing high levels of emission from the SWIR phosphor.

Figure 10:
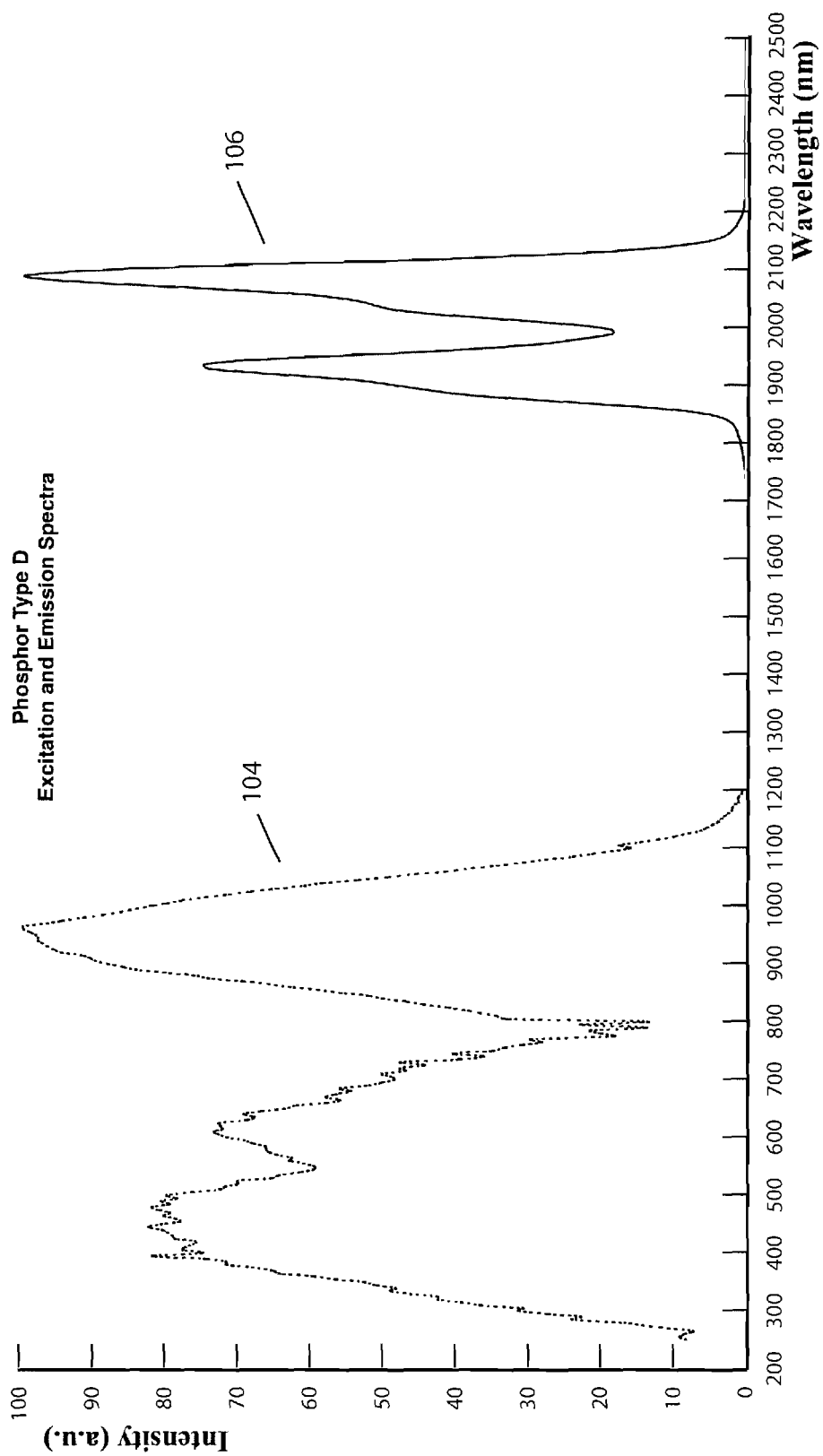
FIG. 10 illustrates an absorption and emission spectra of a phosphor that exhibits strong absorption between about 240 nm and about 1200 nm, and emission between about 1760 nm and about 2220 nm.

FIG. 10 shows absorption and emission spectra of another type of phosphor. As illustrated in FIG. 10, an illustrative example of a phosphor that exhibits strong absorption 104 between about 240 nm and about 1200 nm, and emission 106 between about 1760 nm and about 2220 nm.

Figure 11:
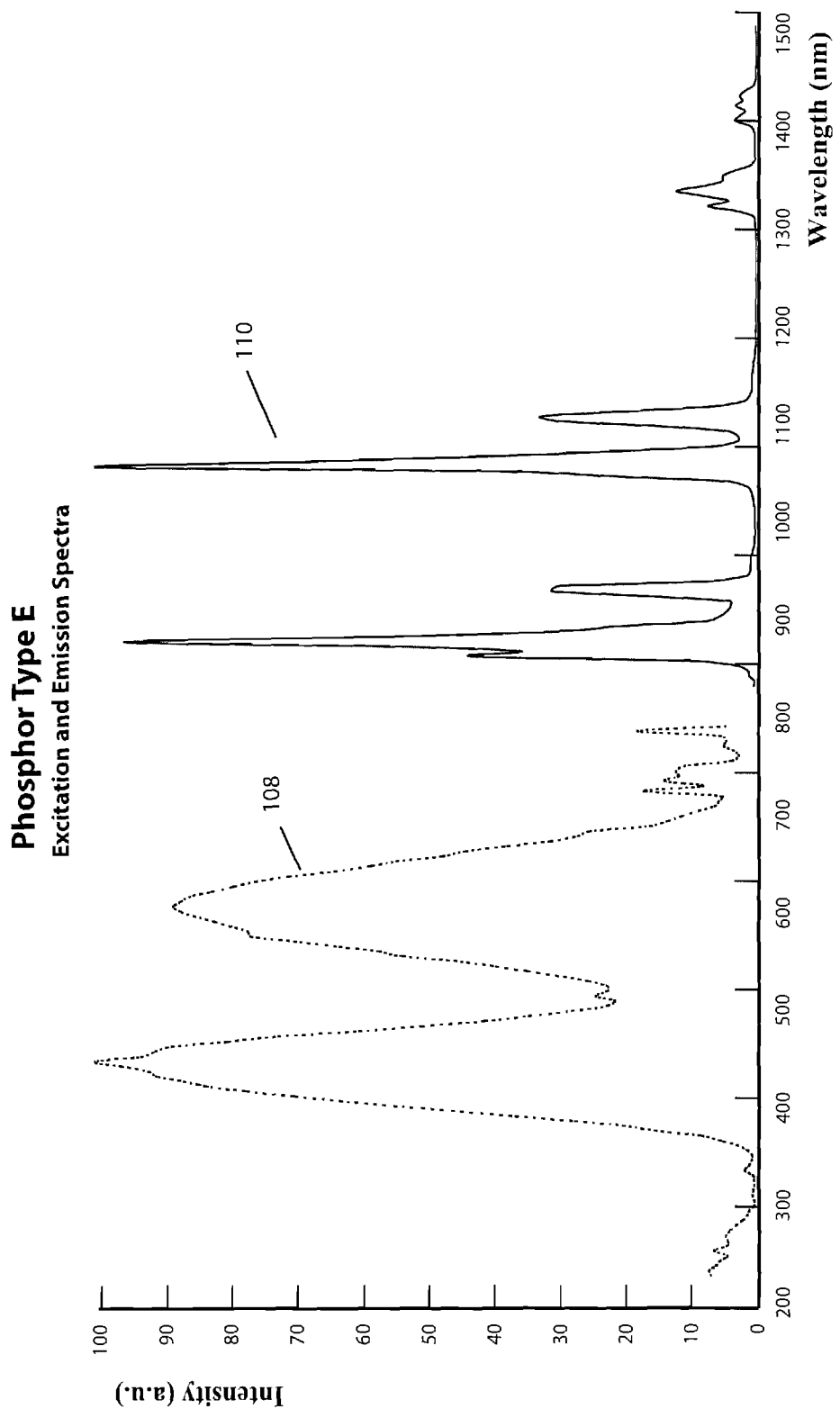
FIG. 11 illustrates an absorption and emission spectra of a phosphor that exhibits strong absorption between about 380 nm and about 800 nm, and desired emission between about 1040 nm and about 1140 nm.

FIG. 11 shows absorption and emission spectra of another type of phosphor. As illustrated in FIG. 11, an illustrative example of a phosphor that exhibits strong absorption 108 between about 380 nm and about 800 nm, and desired emission 110 between about 1040 nm and about 1140 nm.

Preferably, the SWIR energy producing unit 10 is designed to produce a SWIR energy emitting source that does not also produce visible or NIR emission. It is desirable that any visible or NIR emissions be blocked with a suitable filter. This filter, preferably, is at least partially transparent to the SWIR energy of interest so that this energy may be usefully emitted from the device. A selective wavelength filter element may be created using a combination of organic or other dyes, such as anthraquinones, dianthrones, cyanines, heteroaromatics, metal dithiolenes, perylenes, phthalocyanines, rhodamines, tetraaryldiamines, thiazines, triarylamines, or triarylmethanes. The dyes may be incorporated into a substrate or carrier, such as a plastic resin, including plastisol, organisol, or other materials which will form a solid solution (a solid-state solution of one or more solutes in a solvent) in which the dye is efficiently dispersed. The dyes and any carrier or support resin must permit the transmission of SWIR energy so that useful energy can leave the device. Similarly, a thin-film filter, such as a dielectric filter, may be utilized to block visible and NIR energy while permitting the SWIR energy to pass. A combination of these and other filter types may also be advantageously employed.

The SWIR energy producing unit 10 then comprises a light-weight and convenient means of producing SWIR energy from existing visible energy sources.

EXAMPLES

Figure 1B:
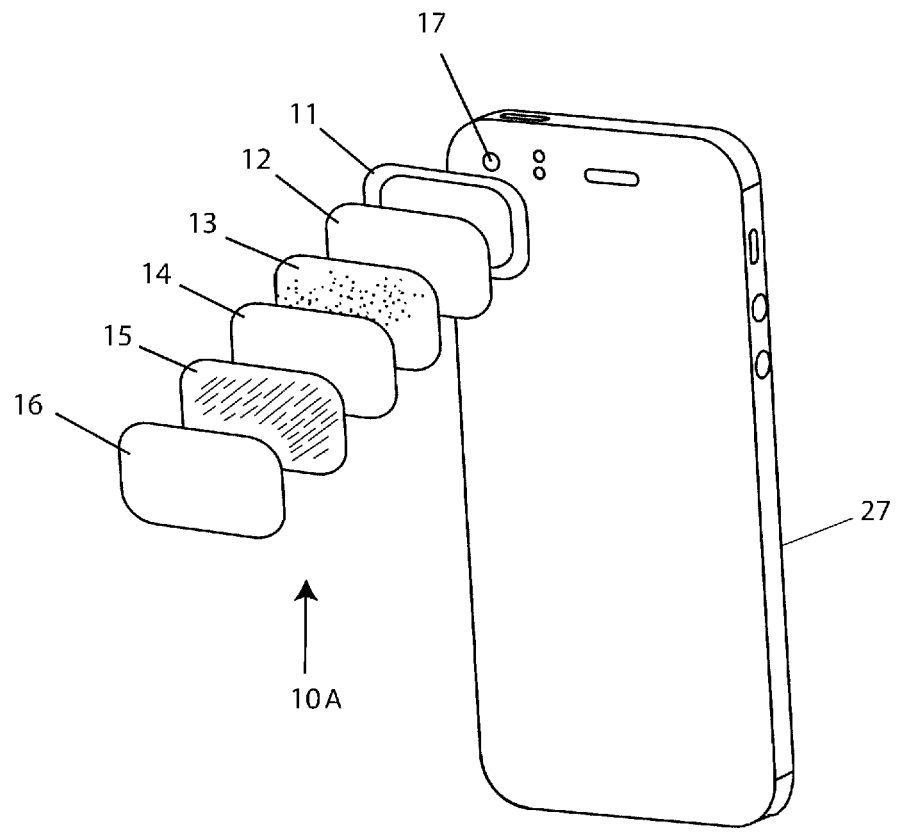
FIG. 1B is an exploded view of one form of the short-wavelength infrared energy producing unit.

Referring to FIGS. 1A and 1B, a patch or "sticker" form of the SWIR energy producing unit 10 is illustrated. The SWIR energy producing unit, herein referred to as the SWIR energy producing sticker 10A may comprise an adhesive attachment member 11 (which may be a chemical adhesive, or loop and hook fastener type attachment, such as VELCRO, or a mechanical attaching mechanism, such as screw) for attaching the SWIR energy producing sticker 10A to a device that emits electromagnetic energy, i.e. smart phone or tablet, a phosphor substrate 12, phosphor 13, adhesive member 14, an electromagnetic energy blocking member, referred to herein as a VIS/NIR blocking filter 15, and, optionally, a scratch shield, 16. The adhesive member 14 binds the phosphor 13 and VIS/NIR blocking filter 15. The SWIR energy producing sticker 10A may take any size and shape as may be desired. As illustrated in FIGS. 1A and 1B, the SWIR energy producing sticker 10A is configured to be fitted over a light emitting element of an electronic device, or other device that emits an electromagnetic energy or has an electromagnetic energy source, preferably visible or UV light, such as a smart device or the camera flash on a smart phone 27 or tablet. The SWIR energy producing sticker 10 may also be fitted over a portion of an illuminated digital display.

Referring again to the embodiment shown in FIGS. 1A and 1B, light from the camera flash illuminates and excites the phosphor 13, thereby causing the phosphor to produce SWIR energy. The VIS/NIR blocking filter 15 prevents undesirable visible light, and any NIR energy that may be present, from being emitted from the system. The attachment member 11, preferably adhesive, may be designed to be opaque to VIS/NIR energy and configured so that stray light is not emitted laterally via the adhesive layer itself or by any substrates which might be transparent to VIS/NIR energy. While this embodiment is shown with a protective or scratch shield 16 and an adhesive layer 14, the functionality of these features may be combined with other features; for example, phosphor 13 may comprise an adhesive agent that serves to bond the phosphor substrate 12 and VIS/NIR blocking filter 15 together. The protective or scratch shield 16 may be made of a material that is at least partially transmissive of the SWIR energy of interest, such as glass or a plastic resin. The protective or scratch shield 16 need not be transparent to visible, NIR, or ultraviolet energies.

For SWIR photoluminescence, one or more lanthanide ions ($Ln^{3+}$) may be used, as known in the art, see Liang, et al., *J. Mater Chem C*, 2017, 5, 6488. The phosphor layer 13 used in this embodiment may be designed to contain the phosphor in a binder/carrier. A preferred, albeit non-limiting, binder/carrier utilized was product 3426, a UV cured urethane-based ink base from Nazdar (Shawnee, Kans.). This type of material provided good transparency to the excitation light and bonded exceptionally well to a variety of substrates, including 3M's 764 adhesive tape product (3M Maplewood, Minn.). The material is tough and flexible after curing, allowing the finished product to be stretched and flexed without damage. It was found that the bond between the 3426 and the 764 products was both a mechanical bond and a chemical bond. Preferably, the dry powdered phosphor was mixed into the un-cured urethane product to form a slurry at concentrations of about 0.5% to concentrations of about 50% (W/W), depending on the SWIR conversion efficiency and SWIR output desired for any given application. The slurry was then deposited onto the substrate, for example 3M product 764, in a controlled thickness, and later cured by application of ultraviolet light. After curing, a preferred, albeit not limiting, thicknesses of between 0.001" to about 0.080" was determined to be functional for the application.

An illustrative example of an effective VIS/NIR filter 15 for use in the boot embodiment was created using a commercial product referred to as SPECTRE™ 160 (visibly-opaque IR transmitting (VOIRT) screen ink, absorbs 200-1065 nm, transmits >1165 nm), available from Epolin, Inc. (Newark, N.J.). The SPECTRE™ 160 was supplied in the form of an air dry, viscous ink that could be screen printed, or, alternately, applied in a controlled thickness layer by the use of doctor blades. In an illustrative example, the VIS/NIR filter layer was applied directly over the phosphor layer. After curing, the preferred thicknesses were between 0.0005" to about 0.020", although other thicknesses worked as well.

A second (dye) product EPOLIGHT™ 7527G (visible opaque dye, blocks light from 200 nm to 1065 nm), also from Epolin, can be used to produce a suitable VIS/NIR filter. This dye was supplied as a powder, and used by incorporating it into a suitable carrier which serves to both disperse the dye and bond it to a substrate, typically the phosphor layer 13. A suitable carrier may be, for example, a solvent-based, SWIR transparent paint base such as Nazdar's S226 clear mixing base.

Figure 2A:
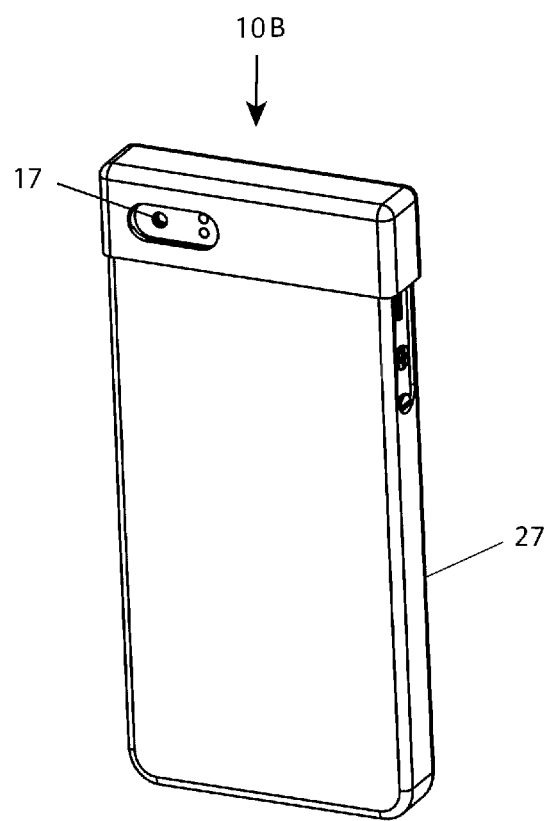
FIG. 2A is a perspective view of the short-wavelength infrared energy producing unit, shown as a "boot" or "cap" that slips over at least a portion of the device, having at least one source for emitting electromagnetic energy, in this example, a smart phone.
Figure 2B:
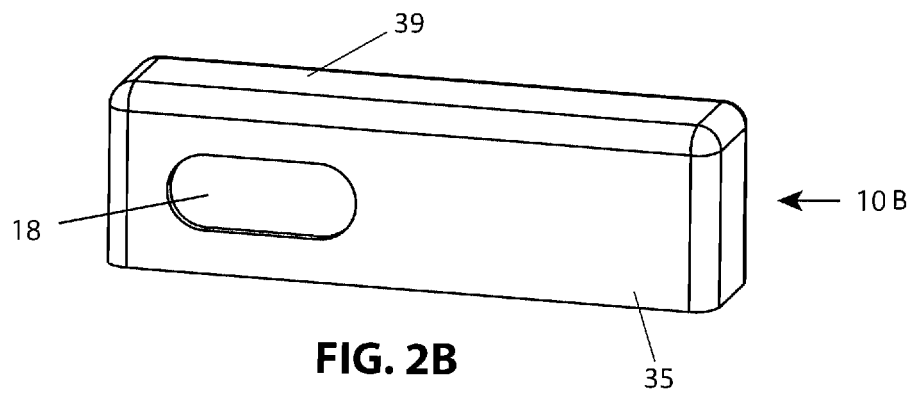
FIG. 2B is a front perspective view of the boot shown in FIG. 2A.
Figure 2C:
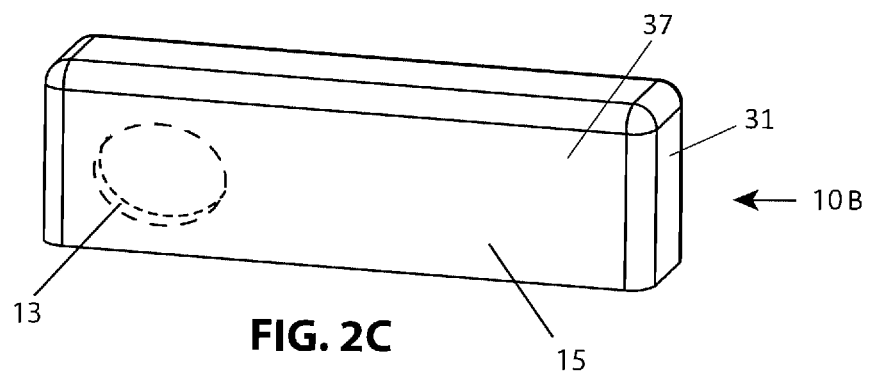
FIG. 2C is a rear view perspective of the boot shown in FIG. 2A.

FIGS. 2A, 2B, 2C and 2D show a form of the SWIR energy producing unit 10 that does not require an adhesive for attachment, but is instead attached to the smart device (smart phone 27) by a friction fit. In FIG. 2A, the SWIR energy producing unit 10 is shown positioned on a smart phone 27 in a manner that permits normal operation of the camera flash 17. In this example, the SWIR energy producing unit 10 is in the form of a "boot", herein referred to as the SWIR energy producing boot 10B. The SWIR energy producing boot 10A comprises a phosphor 13 (FIG. 2C) and a VIS/NIR blocking filter 15 (FIG. 2C). Both the phosphor 13 and the VIS/NIR blocking filter 15 may be incorporated into the material. Suitable materials to construct the SWIR energy producing boot 10B may include, but are not limited to, flexible urethane plastics, vinyl, silicones, thermoplastic elastomers and the like. It has been found that materials with a hardness of Shore A65 are particularly suitable for this application, though materials of other hardnesses are also suitable. As a matter of convenience, and for reasons of product simplification, the VIS/NIR filter 15 is shown as comprising all the outermost surface of the SWIR energy producing boot 10B. If it is desired to conserve the dyes or other materials that make up the VIS/NIR filter 15, the VIS/NIR filter 15 may comprise only that portion of the device that is necessary to pass SWIR, but filter out VIS/NIR emissions, with the rest of the outer layer being comprised of a material that may or may not block VIS or NIR emissions. If it is desired to store the SWIR energy producing boot 10 on the smart device, but not produce SWIR energy, the SWIR energy producing boot 10B may be readily positioned on the smart device such that window 18 is situated over the camera flash LED. In this manner, normal function of the flash is not hindered and the phosphor in the SWIR energy producing boot 10B will not produce SWIR emissions.

Figure 2D:
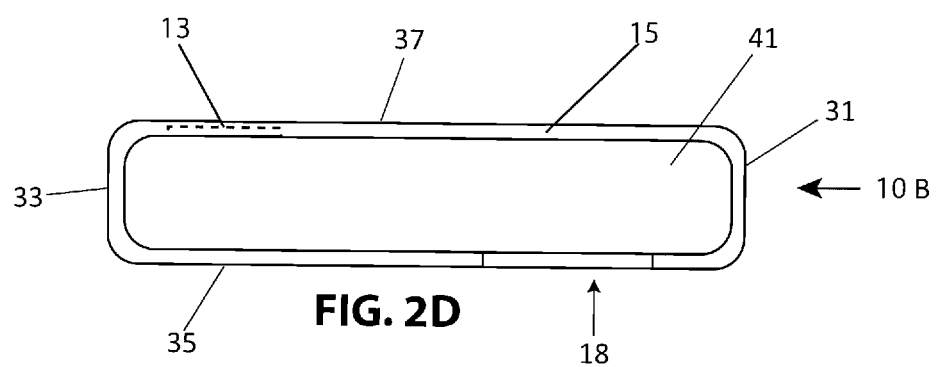
FIG. 2D is a bottom view of the boot shown in FIG. 2A.

The SWIR energy producing boot 10B, which may act as a frictional fit member, may comprise two opposing side walls 31 and 33, a front wall 35 and a back wall 37, see FIG. 2D. A top wall 39 partially encloses an interior region 41. The bottom end is open to allow access to the interior region 41. The interior region 41 is sized and shaped to receive or engage with at least a portion of a device having a source for emitting ultraviolet or visible light, i.e. the smart phone 27. The SWIR energy producing boot 10, comprises an opening 18 of sufficient size to allow emission of electromagnetic energy from smart phone 27 on the first, front wall 35 and the phosphor layer 13 and said electromagnetic energy blocking member 15 positioned on the opposite, second, back wall 37.

The SWIR energy producing boot 10B was found to function well and produce significant SWIR emission when placed on an Apple iPhone. The phosphor layer used in this embodiment may be designed to contain the phosphor in a binder/carrier. A preferred, albeit non-limiting, binder/carrier utilized was product 3426, a UV cured urethane-based ink base from Nazdar (Shawnee, Kans.). This type of material provided good transparency to the excitation light and bonded exceptionally well to a variety of substrates, including 3M's 764 adhesive tape product (3M Maplewood, Minn.). The material is tough and flexible after curing, allowing the finished product to be stretched and flexed without damage.

It was found that the bond between the 3426 and the 764 products was both a mechanical bond and a chemical bond. Preferably, the dry powdered phosphor was mixed into the un-cured urethane product to form a slurry at concentrations of about 0.5% to concentrations of about 50% (W/W), depending on the SWIR conversion efficiency and SWIR output desired for any given application. The slurry was then deposited onto the substrate, for example 3M product 764, in a controlled thickness, and later cured by application of ultraviolet light. After curing, a preferred, albeit not limiting, thicknesses of between 0.001" to about 0.080" was determined to be functional for the application.

An illustrative example of an effective VIS/NIR filter 15 for use in the SWIR energy producing boot 10B embodiment was created using a commercial product referred to as SPECTRE™ 160 (visibly-opaque IR transmitting (VOIRT) screen ink, absorbs 200-1065 nm, transmits >1165 nm), available from Epolin, Inc. (Newark, N.J.). The SPECTRE™ 160 was supplied in the form of an air dry, viscous ink that could be screen printed, or, alternately, applied in a controlled thickness layer by the use of doctor blades. In an illustrative example, the VIS/NIR filter layer 15 was applied directly over the phosphor layer 13. After curing, the preferred thicknesses were between 0.0005" to about 0.020", although other thicknesses worked as well.

A second (dye) product EPOLIGHT™ 7527G (visible opaque dye, blocks light from 200 nm to 1065 nm), also from Epolin, can be used to produce a suitable VIS/NIR filter 15. This dye was supplied as a powder and used by incorporating it into a suitable carrier, which serves to both disperse the dye and bond it to a substrate, typically the phosphor layer 13. A suitable carrier may be, for example, a solvent-based, SWIR transparent, paint base such as Nazdar's S226 clear mixing base.

While the phosphor layer 13 and the VIS/NIR filter 15 were formed separately, both the phosphor containing element and the VIS/NIR filter element could alternately utilize a two-part, urethane-based material, such as BJB WC565, from BJB Enterprises (Tustin, Calif.). The WC565 material is a "water clear" urethane rubber product that cures after combining an "A" and "B" component. This WC565 material is highly transmissive in the excitation band of the phosphor, as well as being highly transmissive to SWIR energy. Because both the SWIR producing element and the VIS/NIR filter element were produced using the same base material, "insert molding" a cured SWIR producing element directly into the VIS/NIR filter portion of the device while obtaining excellent adhesion between the two elements was possible. The cured products were tough and flexible, curing to a hardness of approximately SHORE A65. Concentrations of the phosphor and VIS/NIR blocker dye can vary widely depending on the thickness of the respective elements and the desired SWIR production and VIS/NIR light blockage.

Figure 3A:
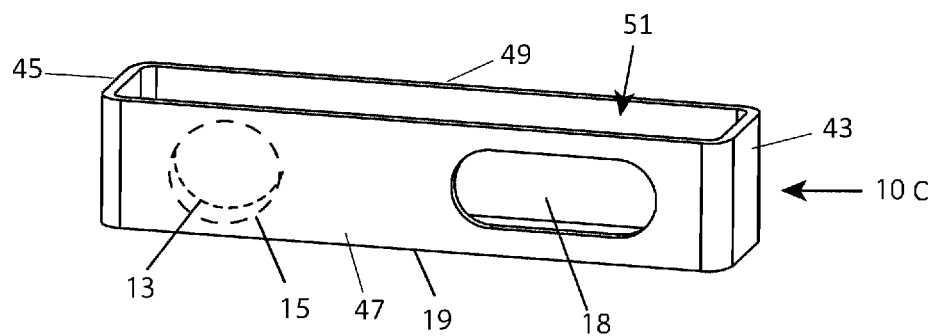
FIG. 3A is a perspective view of the short-wavelength infrared energy producing unit, shown as a slidable band, that fits over a portion of the device having at least one source for emitting electromagnetic energy.
Figure 3B:
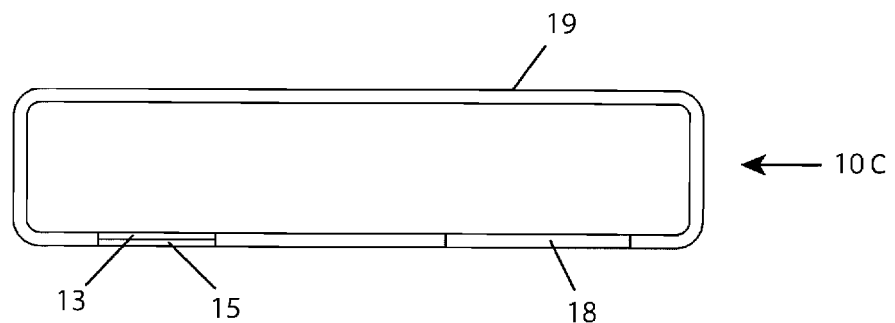
FIG. 3B is a section view of the band shown in FIG. 3A.

FIGS. 3A and 3B show a slidable form of the SWIR energy producing unit 10 similar to a "rubber band". In this example, the SWIR energy producing unit 10 is in the form of an elastic band, herein referred to as the SWIR energy producing elastic band 10C. The SWIR energy producing elastic band 10 comprises phosphor 13, VIS/NIR blocking filter 15 and window 18, each functioning as previously described. Illustrative examples of the phosphor 13 and VIS/NIR blocking filter 15 are the same as described above. The SWIR energy producing elastic band 10C may include an elastic and stretchable body 19 having two opposing side or end walls 43 and 45, a front wall 47, a back wall 49, constructed as a single member or individually and adhered together to enclose region 51. The SWIR energy producing elastic band 10C comprises a window opening 18 of sufficient size to allow emission of electromagnetic energy from the smart phone 27 on one portion of the front wall 47, and the phosphor 13 and VIS/NIR blocking filter 15 on a different, separated portion of the front wall 47.

The elastic nature of the band 19 permits it to be readily affixed to smart devices of varying sizes and shapes. Once again, the VIS/NIR filter 15 may comprise the entire outermost surface of the band, or may be limited to the region of the device in which SWIR energy must pass, but VIS/NIR energy must be blocked.

Figure 4:
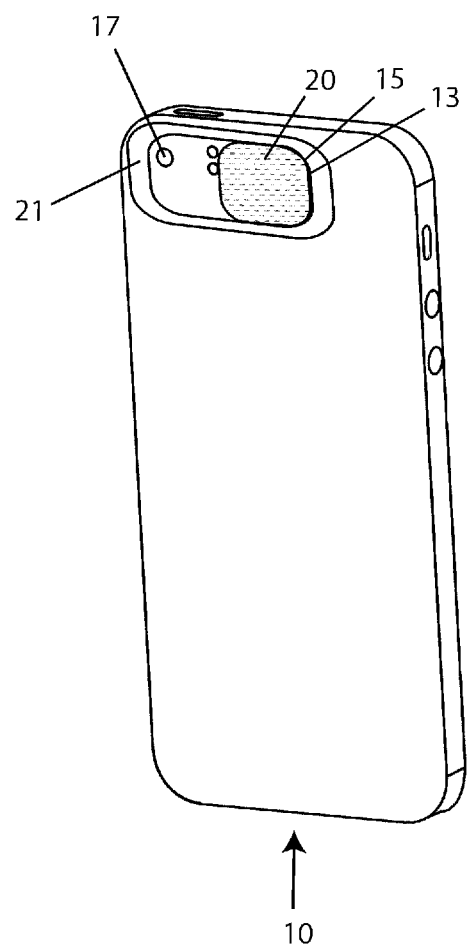
FIG. 4 illustrates a device with a slidable, rotatable, or otherwise movable short-wavelength infrared energy producing unit that may alternately be moved into position in front of the light emitter or away from the light emitter.

FIG. 4 shows a form of the SWIR energy producing unit 10 employing a movable member 20 moving on, within or about support member 21. Movable member 20 comprises VIS/NIR blocking filter 15 and phosphor 13. Illustrative examples of the phosphor 13 and VIS/NIR blocking filter 15 are the same as described above. In this embodiment, the movable member 20 is positioned in front of the camera flash 17 to produce SWIR energy and slid, rotated or otherwise moved away from the camera flash 17 when normal flash operation and no production of SWIR energy is desired.

Figure 5:
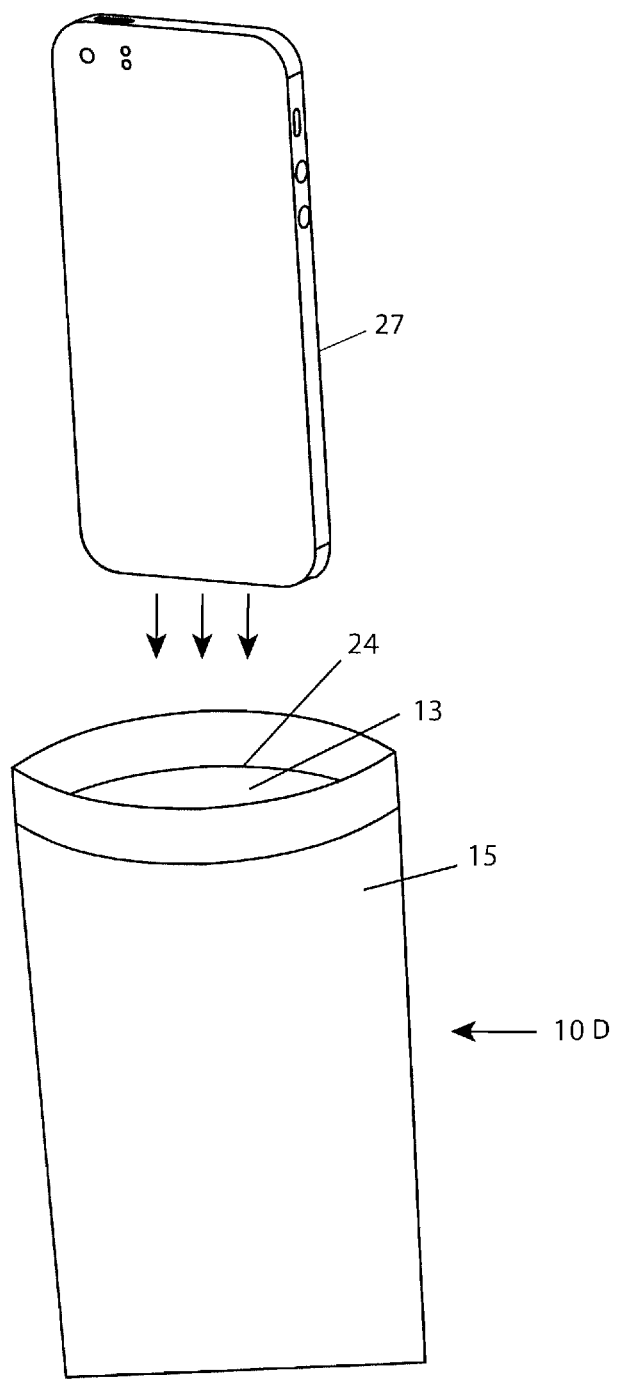
FIG. 5 illustrates the short-wavelength infrared energy producing unit in the form of a bag or pouch which envelopes at least a portion of the device having at least one source for emitting electromagnetic energy.

FIG. 5 shows an embodiment of the SWIR energy producing unit 10 in the form of a pouch, bag or other enclosure that is designed to accommodate a smart phone, tablet or other light emitting device, herein referred to as SWIR energy producing pouch 10D. The SWIR energy producing pouch 10D may comprise a seal 24, such as a continuous zipper, like those used for sandwich bags, a hook and loop fastening system, a fold over, a pressure sensitive seal, or other known means to prevent the escape of undesirable VIS/NIR energy. The SWIR energy producing pouch 10D employs a phosphor 13 as an inner layer and a VIS/NIR filter 15 as an outer layer. Illustrative examples of the phosphor 13 and VIS/NIR filter 15 are the same as described above. This combination of phosphor 13 and VIS/NIR filter 15 may comprise the entire pouch, if desired, so that proper function will be afforded, regardless of the orientation of the smart device, flashlight or other light emitting device within the SWIR energy producing pouch 10D. A scratch shield, as described previously, may be employed if desired to prevent damage to the VIS/NIR filter 15. Likewise, other layers may be employed to prevent damage to the phosphor 13. When not in use, the SWIR energy producing pouch 10D may be conveniently folded and placed in a pocket for future use.

Figure 6:
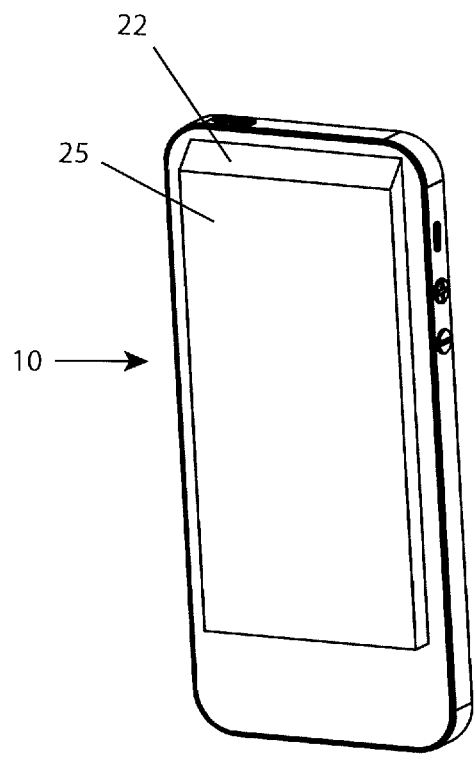
FIG. 6 is a perspective view of an embodiment of a light directing member.

FIG. 6 illustrates a form of the SWIR energy producing unit 10 with a light directing element 22 designed to spread the SWIR energy emission over a large surface area so that the emitted energy will subtend a relatively large angle in any imaging device for which is to be viewed. Functioning as previously discussed, but not shown, are a phosphor element 13 and a VIS/NIR filter 15. The light directing element 22, such as a prism, mirror or light pipe, may be employed to re-direct SWIR energy over the large emission surface 25 of the device. In one form, this surface may be produced from a polymer, such as acrylics, for example PMMA, similarly styrenes, polycarbonates, PVCs, or other suitable optically transmissive materials, such as glass. that is at least partially transparent to SWIR energy. The phosphor 13 and VIS/NIR filter 15 are then, preferably, placed proximal to the camera flash, and the resulting SWIR energy is distributed by the light directing element and large emission surface working in combination. In another form, the light directing element 22 re-directs visible light from the camera flash to the underside of the large emission area, whereby a phosphor layer converts this visible light to SWIR energy.

A VIS/NIR filter 15 then permits only the desirable SWIR energy to be emitted from the device. A third form employs the phosphor 13 proximal to the camera flash and utilizes a dispersion of VIS/NIR filter material that is distributed throughout at least a portion of the body of the material comprising the structure behind the large area emitter surface. All forms of the device may employ diffusion filters, Fresnel lenses, holographic elements, total internal reflection, or similar known means to promote even distribution of optical energy over the large emission surface. To switch between emission of SWIR energy and visible light, the device may be slid out of the way of the camera flash so that visible light does not energize the phosphor. Rails or tracks may be employed to facilitate the sliding action. Alternately, the device may be completely removed from the smart device when it is not desired to produce SWIR energy.

Figure 7:
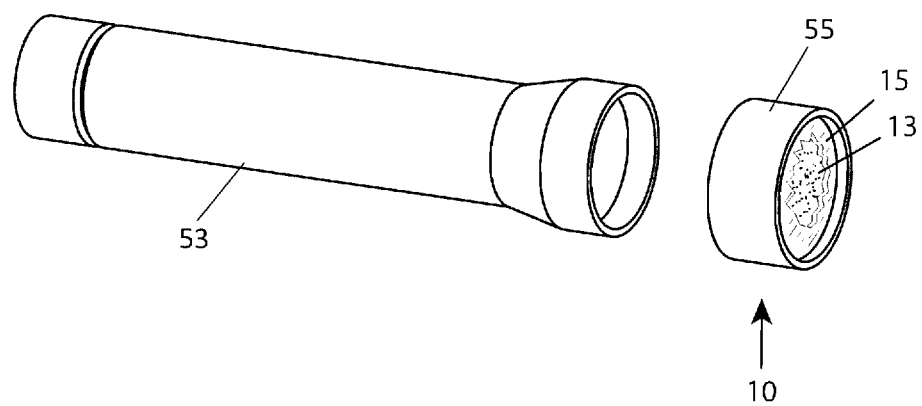
FIG. 7 illustrates the short-wavelength infrared energy producing unit configured to be fitted to a flashlight.

FIG. 7 illustrates the SWIR energy producing unit 10 designed to be utilized with a flashlight 53, which may be incorporated into a rigid plastic ring 55 ring. The phosphor 13 and VIS/NIR filter 15 are the same as described above and function as previously described to respectively convert light from the flashlight 53 to SWIR energy and block undesirable VIS/NIR energy. The SWIR energy producing unit 10 may be friction fitted to the flashlight, screwed on to the flashlight, or attached with magnets or any other convenient means. The device may be readily removed so that the flashlight can be returned to normal operation.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures, and techniques described herein are presently representative of the preferred embodiments, are intended to be exemplary and are not intended as limitations of the scope. Changes therein and other uses will occur to those skilled in the art which are encompassed within the spirit of the invention and are defined by the scope of the appended claims. Although the invention has with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A short-wavelength infrared energy producing unit configured to affix to a device capable of emitting at least one source of electromagnetic energy comprising:

a substrate material securable to said device capable of emitting at least one source of electromagnetic energy through a frictional fit attachment member comprising a plurality of walls formed together to partially enclose an interior region, said interior region sized and shaped to receive or engage with at least a portion of a device having a source for emitting ultraviolet or visible light;
a phosphor layer; and
an electromagnetic energy blocking layer;
said frictional fit attachment member comprises an opening of sufficient size to allow emission of electromagnetic energy from said at least one source of electromagnetic energy on one first, front wall and said phosphor layer and said electromagnetic energy blocking layer positioned on an opposite, second, back wall.

2. The short-wavelength infrared energy producing unit configured to affix to a device capable of emitting at least one source of electromagnetic energy according to claim 1, further including an attachment member.

3. The short-wavelength infrared energy producing unit configured to affix to a device capable of emitting at least one source of electromagnetic energy according to claim 2, wherein said attachment member includes a pressure sensitive adhesive.

4. The device for producing short-wavelength infrared emissions according to claim 1, further including a protective shield.

5. The device for producing short-wavelength infrared emissions according to claim 4, wherein said protective shield is made of an optically transmissive material.

6. The short-wavelength infrared energy producing unit according to claim 1, wherein said phosphor is contained in a binder or carrier.

7. The short-wavelength infrared energy producing unit according to claim 1, wherein said electromagnetic energy blocking layer is one or more wavelength-blocking optical filters configured to at least partially block emissions of NIR light, visible light, or combinations thereof.

8. The device for producing short-wavelength infrared emissions according to claim 1, wherein said electromagnetic energy blocking layer is a NIR or visible light filter configured to render said device capable of emitting at least one source of electromagnetic energy invisible to a NIR or visible light detection system or sensor.

* * * * *